United States Patent
Boudville

(10) Patent No.: US 10,565,269 B2
(45) Date of Patent: Feb. 18, 2020

(54) APP SOCIAL NETWORK OF LINKET AND DEEP LINK USERS

(71) Applicant: Wesley John Boudville, Perth (AU)

(72) Inventor: Wesley John Boudville, Perth (AU)

(*) Notice: Subject to any disclaimer, the term of this patent is extended or adjusted under 35 U.S.C. 154(b) by 790 days.

(21) Appl. No.: 15/330,147

(22) Filed: Aug. 16, 2016

(65) Prior Publication Data
US 2018/0052927 A1     Feb. 22, 2018

(51) Int. Cl.
| | |
|---|---|
| *G06F 7/00* | (2006.01) |
| *G06F 16/951* | (2019.01) |
| *H04L 29/08* | (2006.01) |
| *G06F 17/00* | (2019.01) |
| *H04L 29/06* | (2006.01) |

(52) U.S. Cl.
CPC ........ *G06F 16/951* (2019.01); *H04L 67/1044* (2013.01); *H04L 67/34* (2013.01); *H04L 63/104* (2013.01)

(58) Field of Classification Search
CPC ... G06F 16/951; H04L 67/1044; H04L 67/34; H04L 63/104
See application file for complete search history.

(56) References Cited

U.S. PATENT DOCUMENTS

| | | | |
|---|---|---|---|
| 8,433,800 B2 | 4/2013 | Chor | |
| 2007/0198741 A1* | 8/2007 | Duffy | G06F 16/957 709/245 |
| 2012/0166482 A1* | 6/2012 | Deshmukh | G06Q 10/10 707/770 |
| 2013/0079032 A1* | 3/2013 | Singhal | H04L 61/15 455/456.2 |
| 2013/0110815 A1 | 5/2013 | Tankovich | |
| 2013/0198636 A1* | 8/2013 | Kief | G06F 17/2241 715/730 |
| 2013/0304729 A1* | 11/2013 | Jiang | H04L 67/02 707/723 |
| 2013/0334300 A1 | 12/2013 | Evans | |
| 2014/0089413 A1 | 3/2014 | Evans | |
| 2015/0154644 A1 | 6/2015 | Saxena | |
| 2015/0156061 A1 | 6/2015 | Saxena | |
| 2016/0142858 A1* | 5/2016 | Molinet | H04L 67/42 709/203 |
| 2016/0321064 A1* | 11/2016 | Sankaranarasimhan | G06F 16/951 |

* cited by examiner

*Primary Examiner* — Kannan Shanmugasundaram

(57) ABSTRACT

A Registry stores data about linkets. A linket has data about users who use it to interact with the linket owner via an app or bot. This linket group lets members interact with each other. To help each other with advice about using the linket. The Registry can host a message board, where users of a linket can communicate with each other. The linket owner gets feedback about her interactions with the users. It is easier for her to shift from using an app in the deep link to an app made by a different firm. The user data is not held by any app firm, allowing this independence.

1 Claim, 9 Drawing Sheets

Web page 70

Jane Music Lessons

| Tutor | Users |
|-------|-------|
| Jane  | 91    |
| Doris | 51    |
| Magda | 14    |

Figure 7

APP SOCIAL NETWORK OF LINKET AND DEEP LINK USERS

TECHNICAL FIELD

Deep links for mobile apps.

BACKGROUND

Mobile apps have a distinctive problem. Most are currently standalone programs that often just converse with an app server run by the company that wrote the app. The apps do not have URL links within them. In general, an app from one company does not interact with an app from another company.

Separately, it is much harder for a search engine, which is optimised to search the Web for webpages, to search arbitrary apps. There is no standard syntax equivalent to an URL or URI to enable this.

To enable such and other functionality in mobile apps has been termed 'deep linking' within apps. (The term also has an earlier use that refers to standard web pages and URL links within them. This submission does not use that earlier meaning.)

Major companies have several projects aimed at defining deep links. FACEBOOK Corp. has APP LINKS™ GOOGLE Corp. has APP INDEXING™ and GOOGLE INTENTS™ TWITTER Corp. has APP CARDS™ APPLE Corp. has APPLE EXTENSIONS™ YAHOO Corp. has 2 US patents. There are also several startups, like BIT.LY. Corp., BRANCH METRICS Corp., BUTTON Corp., DEEPLINK Corp., FUKOROU Corp., HAPTIK Corp., HOKO Corp., LINKFIRE Corp., QUIXY Corp., TAPSTREAM Corp., URX Corp., WILDCARD Corp., and YOZIO Corp., each with its own initiative. The syntax and functionality vary between these company specific efforts.

We recommend that if the reader is new to the idea of deep links, to read 2 articles. "Apps everywhere but no unifying link" by C. Dougherty, NEW YORK TIMES Corp., 5 Jan. 2015. And "Deep linking's big untapped potential" by M. Thomson, VENTUREBEAT.COM, 9 Aug. 2015. Both at least at this time of writing are available online. They are well written. The first article is accessible to the general reader. The second article has slightly more technical details. They give an understanding of deep links and the business potential, as understood publicly in the prior art of 2015-6.

BRIEF DESCRIPTION OF THE DRAWINGS

FIG. 7 shows a page of users grouped by tutor.

DETAILED DESCRIPTION OF THE PREFERRED EMBODIMENT

Figure 1:
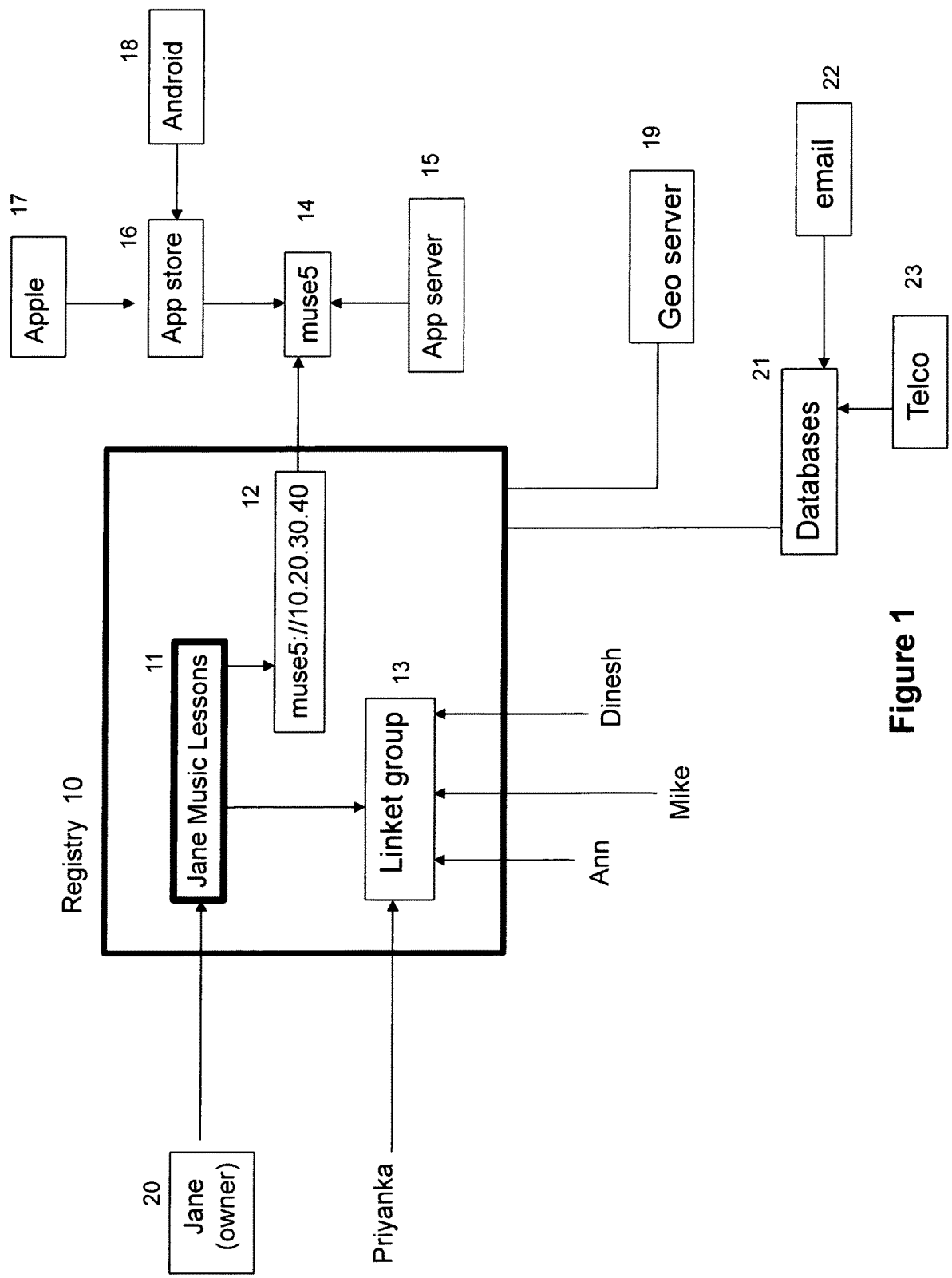
FIG. 1 shows the Registry with a linket and a group of linket users.

What we claim as new and desire to secure by letters patent is set forth in the following claims.

This submission refers to our earlier submissions to the US PTO: "Cellphone changing an electronic display that contains a barcode", filed 16 May 2011, U.S. Pat. No. 8,532,632 ["1"]; "Using dynamic barcodes to send data to a cellphone", filed 28 Jul. 2011, U.S. Pat. No. 8,348,149 ["2"]; "Transmitting and receiving data via barcodes through a cellphone for privacy and anonymity", filed 4 Oct. 2011, U.S. Pat. No. 8,707,163 ["3"]; "Colour barcodes and cellphone", filed 16 Dec. 2011, U.S. Pat. No. 8,821,277 ["4"]; "Mobile device audio from an external video display using a barcode", filed 25 May 2012, U.S. Pat. No. 8,708,224 ["5"]; "Dynamic group purchases using barcodes", filed 29 May 2012, U.S. Pat. No. 8,655,694 ["6"]; "Chirp to control devices", filed 9 Oct. 2012, US patent application 20140098644 ["7"]; "Barcode-based methods to enhance mobile multiplayer games", filed 22 May 2013, US patent application 20140349746 ["8"]; "Barcode, sound and collision for a unified user interaction", filed October 2013, US patent application 20150113068 ["9"].

We have these co-pending applications for deep linking:
"Deep linking of mobile apps by barcode, sound or collision", filed Feb. 18, 2015, U.S. patent application Ser. No. 14/544,763 ["10"],
"Cookies and anti-ad blocker using deep links in mobile apps", filed Jun. 8, 2015, U.S. patent application Ser. No. 14/545,694 ["11"];
"Blockchain and deep links for mobile apps", filed Jul. 28, 2015, US patent application Ser. No. 14/756,058 ["12"];
"Different apps on different mobile devices interacting via deep links", filed Aug. 18, 2015, U.S. patent application Ser. No. 14/756,208 ["13"].
"Linket to control mobile deep links", filed Oct. 19, 2015, U.S. patent application Ser. No. 14/756,815 ["14"].
"Capacity and automated de-install of linket mobile apps with deep links", filed Nov. 10, 2015, U.S. patent application Ser. No. 14/757,027 ["15"].
"App social network via linket and ads for mobile deep links", filed 11 Dec. 2015, U.S. patent application Ser. No. 14/757,261 ["16"].
"App group, ad bandwidth, hand off for linket and mobile deep links", filed 28 Dec. 2015, U.S. patent application Ser. No. 14/998,349 ["17"].
"App streaming, bidirectional linket, phone number for mobile deep links", filed 4 Jan. 2016, U.S. patent application Ser. No. 14/998,440 ["18"].
"Hashtag, deep link and linket for more user interactions", filed 7 Jun. 2016, U.S. patent application Ser. No. 14/999,625 ["19"].

We described deep links and ways that these could enhance interactions between two mobile devices near each other. The current submission describes a higher level of use of deep links.

We define some terminology.

This submission is mostly about mobile devices carried or worn by people. The most common mobile device is a cellphone. We take this word to also include "smartphone". The latter term arose to describe a cellphone that also had a camera and Internet access, when such features were relatively new to cellphones. Other types of mobile devices are tablets, laptops, notebooks, netbooks, PDAs and wearable devices.

We will make frequent references to "app store" and "app server". Despite the similarity in names, these are different entities. An app store is typically run by a maker of a mobile device (like APPLE Corp., MICROSOFT Corp.), or a provider of an operating system for mobile devices (like GOOGLE Corp.). Software companies that make mobile apps submit these to an app store. So users can find the apps in the app store and download them to the mobile devices. An app server is a server run by one of those software companies. A mobile user can use her device browser to go to the website of the app server, to download the app.

When we later describe an instance of an app interacting with an instance of another app, we might say, for brevity, a statement like "the first app interacts with the second app", when strictly it should be "an instance of the first app interacts with an instance of the second app". There should be no confusion with the use of the shorter phrase. But when 2 instances of an app interact with each other, a more precise phrasing is needed, like "a first instance of the app interacts with a second instance of the app".

Related to this is a notational convenience. We shall refer to an app, and call it Alpha, for example, in the text and figures. Sometimes "Alpha" shall mean the app executable. Other times, it shall mean the id of the app, where the id is unique across "all" apps. In turn, "all" might mean across all apps in an app store for a given hardware platform. Or across all hardware platforms.

This submission has the following sections.
1: Earlier submissions;
2: App social network;
3: Change ownership of a linket;
4: Subcontracting;
5: Implications;
6: Look for users with specific interests;
7: Map users with linkets and topics;
1: Earlier Submissions;

This submission extends our work in submissions 14, 15, 16, 17, 18 and 19 on linkets. We encourage the reader to read those for a fuller discussion of linkets. In this section, we summarise that earlier work.

The prior art uses "deep link" to mean two apps running on one mobile device. The first app has a deep link which is selectable by the user. When the deep link is selected, something happens to cause the second app to be installed on the device. Since typically the second app is not present. The second app is run, with an input argument which causes it to start up and show a particular item or "page", rather than just a generic "home page". The "something happens" refers to different ways that different companies have, to enable this.

Our deep link, as defined in submissions 10-18, is fundamentally different. It lets 2 mobile devices interact. One category (or use case) for us (and not in the prior art) is one app running on 2 mobile devices. By one app, we mean 2 instances of the app. These 2 instances interact across the network. Another category is 2 apps running on 2 mobile devices. One app runs on one device, another app runs on the other device, and the apps interact across the network. Our deep link is for (though not exclusively) multiuser interactions. The category of one app on 2 devices can be for multiplayer games. Or even a single player game, where the second device runs a second instance of the game in spectator mode. The second device screen shows the game window of the first device. But the second device cannot alter the game position on the first device. Read only for the user of the second device. (There are some caveats for situations where the second device might make some alterations.)

FIG. 1 has item 12, which is our deep link. The example in item 12 is muse5://10.20.30.40. Muse5 is a placeholder for an app id. The app id is typically assigned to the app when it is in an app store, by the entity running the app store. The other part of the deep link in this example is 10.20.30.40. This is the network address of a computer program run by the linket owner. The example address is for Internet Protocol version 4. It generalises to IPv6 or to other types of networks.

We stress that the format of the deep link in FIG. 1 is arbitrary. In more general terms, our deep link has at least 2 items. An id of an app. And a network address. The deep link could have more entities, as described in our earlier submissions.

We define a "linket" to be the label of a deep link. The linket can be expressed in Unicode. The linket can be case sensitive. Unlike domain names. This improves the readability of expressions. Case sensitivity is moot for languages like Chinese or Hindi which do not have the concept. The linket can have (but not necessarily) white space.

The linket lets individuals have a personal brand associated with themselves. This uses the following observations. Many (most ?) people in many countries now have cellphones. A user's cellphone becomes an extension of herself, as has been observed. It is the most common type of personal computer in the world.

A person can own a linket. A corporation can also own a linket.

Another trend is the rise of the so-called gig or freelance economy, as exemplified by companies like UBER Corp., LYFT Corp. and AIRBNB Corp. letting individuals offer their services. Where the labour market tends to a friction free state. Our linket and the personal branding it offers is an enabler of the trend. However the hardware barrier to entry of a person owning a linket is much cheaper. For AIRBNB Corp., the user needs to own (or rent) a home. To own can cost over $US300 000. For UBER Corp., the user needs to own or rent a car. To own can cost $US20 000. In contrast, to use a linket requires a cellphone. A top of the line mobile phone can cost $US600. One to two orders of magnitude cheaper than the other cases.

For descriptive simplicity in what follows, we shall write the linket as a string enclosed in quotes. This is meant to describe its string contents in an understandable way that is independent of a choice of format of the delimiters.

2: App Social Network;

In application 16, we described briefly some means of making an app social network from the linket and its Registry, via analysis of data from users interacting with the Registry. Largely those methods did not entail the linket owners or users doing any specific steps to be in a social network. In contrast, the current submission describes extra steps that owners and users can do, as well as corresponding extra and necessary functionality by the Registry. These steps expand the scope and value of the previous app social network.

See FIG. 1. There is Registry 10 and Jane 20. She teaches music. She is the owner of the linket "Jane Music Lessons" 11. This maps to the deep link 12, muse5://10.20.30.40. Muse5 is the id of the music instructional app that Jane's students use. For simplicity, we assume that she also uses the same app in a teacher mode. The 10.20.30.40 is the Internet address of the instance of her app.

The arrow going from deep link 12 to the item 14, muse5, when item 14 sits outside the Registry, means that the app binary is typically not kept in the Registry. Instead, the app can be downloaded from the app server 15, run by the company that owns muse5. Or the app is downloaded from the app store 16.

FIG. 1 depicts one app store. In practice, there are several. One is from APPLE Corp. 17, and one from ANDROID Corp. 18. There can be others. MICROSOFT Corp. could have an app store. AMAZON Corp. could have an app store.

Etc. Currently, there are 2 main cellphone families. APPLE Corp. and ANDROID Corp. But FIG. 1 does not preclude the presence of other and future cellphones, with other app stores.

FIG. 1 can be applied to users using other types of mobile devices. Like Augmented Reality (AR) or Virtual Reality (VR) devices that might be worn by users. Plus FIG. 1 can be applied to non-mobile devices. Like AMAZON ECHO™ This is a consumer device used in a static location, accepting input exclusively or primarily via audio input.

For any type of device, where the user speaks to command the device, instead of via an electronic screen, our linket can be especially useful. A linket is a brand, where the linket presumably is easy to remember by an end user. In contrast, a deep link has some app id and a network address. Note that the deep link example in FIG. 1 has an app id "muse5". An actual app id is unlikely to be so short or meaningful.

As a practical matter, a user cannot be expected to remember a deep link. Especially when she has to say a command to a device. On a screen, a deep link, whether in our format or another format, might be clickable. So while lacking a clear brand semantic, the deep link might have accompanying text explaining what it is about. But with no screen, the user has to dredge up a command from memory. It is far easier for her to say to her device, "Get me Jane Music Lesson" than "Get me muse five colon slash slash ten dot twenty dot . . . ".

FIG. 1 shows the Registry interacting with an external Geo server 19. This server has knowledge about geographic databases. There has now been vast work done on various such databases by firms like YAHOO Corp., GOOGLE Corp. and ESRI Corp. The point about FIG. 1 showing the geo server separate from the Registry is that the Registry might avail itself of one or more of those external databases, rather than have to rebuild a large corpus of geographic data and methods. In this way, the Registry can focus on its core competences.

FIG. 1 might include other external databases like item 21. For example, these might include databases of users at email providers like GOOGLE Corp. or MICROSOFT Corp., as in item 22. It could include databases of phone numbers and users at telecom providers like ATT Corp. and VERIZON Corp., as in item 23.

FIG. 1 also shows several users (aka. students) of Jane. Priyanka, Ann, Mike and Dinesh. They are not labelled separately. They are shown connected to a section of the Registry database called a linket group, associated with Jane's linket. Note that in this submission, the phrase "linket group" refers to users of a linket, and not to a collection of linkets. (Unless otherwise indicated.)

Each user uses a device, which can be a mobile device, and in turn which can be a cellphone, to interact with Jane via her linket.

Jane, the linket owner, can let her users find and communicate with each other. A user can define a nickname or handle, along with some optional self-information. This can be entered via a webpage hosted by the Registry or in a Registry app. The data is then stored in the Registry.

Figure 2:
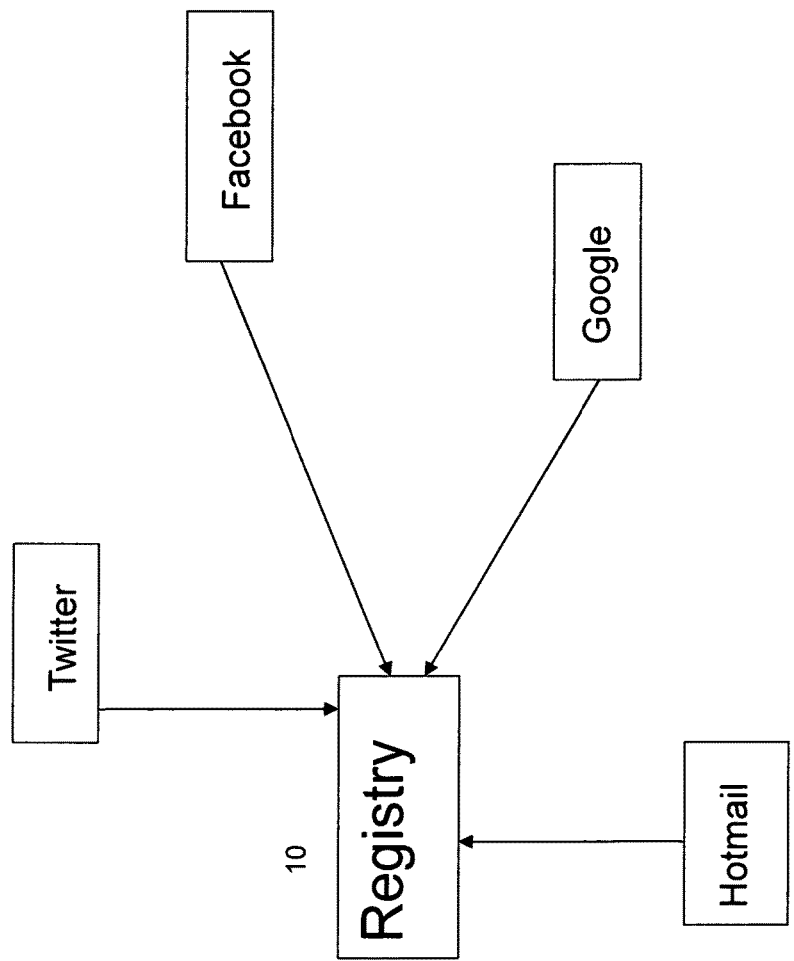
FIG. 2 shows the Registry using login credentials from major websites.

FIG. 2 shows how the Registry can use certain major websites with many users to help the Registry users define or identify themselves. Item 10 in FIG. 2 is item 10 of FIG. 1. The other elements of FIG. 2 are examples of major websites. GOOGLE Corp., FACEBOOK Corp., TWITTER Corp., HOTMAIL™ A user with a pre-existing account at one of these sites could login to the Registry with those credentials.

Figure 4:
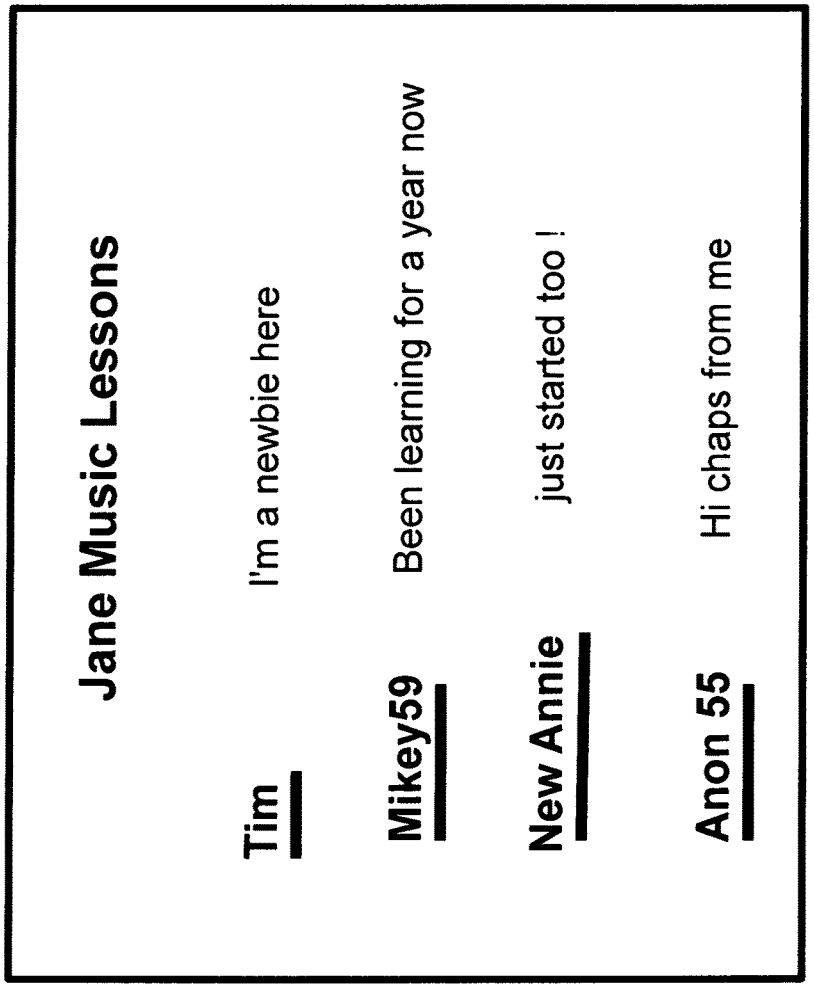
FIG. 4 shows a page of linket users.

A user in Jane's group can go to a web page or app of the Registry and see information about some or all of the users in the group. FIG. 4 shows an example. We shall take the use of a web page or an app to be equivalent, in showing the data. There is web page 40. The title is "Jane Music Lessons", which is Jane's linket. Four users are shown. Priyanka has chosen the nickname Tim. Mike has the nickname Mikey59. Ann has the nickname "New Annie". Dinesh has chosen to call himself "Anon 55". The horizontal black bars under each nickname indicate that these are clickable.

When one is clicked, a message can be sent to that user. The message might be sent as an email, as an Instant Message or SMS to a phone number. Or any other type of electronic message.

Figure 3:
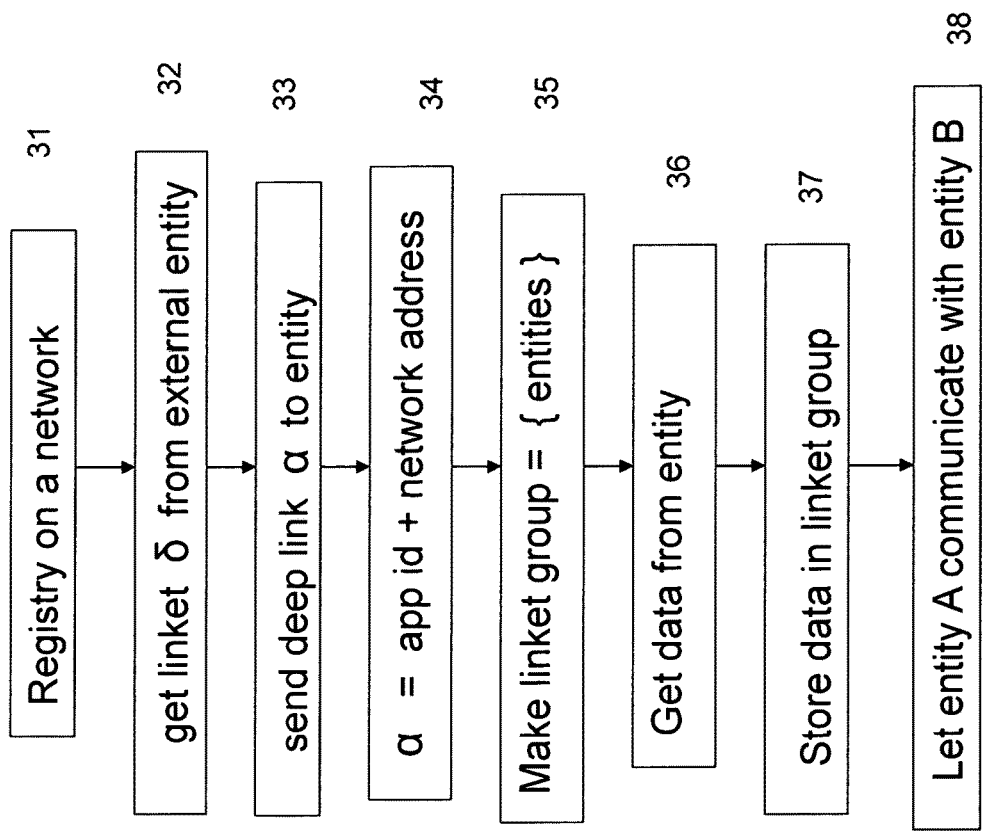
FIG. 3 is a flow chart of the Registry with a linket group.

FIG. 3 is a flow chart summarising the above discussion. Item 31 is the Registry on an electronic network. Item 32 is the Registry getting a linket Delta from an external entity on the network. Here, we conflate an electronic device on the network and the owner of that device. Item 33 is the Registry sending a deep link Alpha to the device. Item 34 is the composition of Alpha—an app id and a network address. Item 35 is the Registry making a linket group associated with Delta. Item 36 is the Registry getting some data about a given entity (like the entity's name and email address) from that entity. Item 37 is the Registry storing that data in the data structures of the entity group.

The configuration thus far uses the nicknames as a privacy measure for the users. Another way would let or require the users to give an actual electronic address, which is shown in FIG. 4. Plus perhaps a verified name. What is "verified" might be the name associated with a credit or debit card, for example.

In Jane's linket example, she is the teacher and users are students. If she is an entrepreneur, users might be customers of what services or goods she offers.

The Registry might give Jane the ability for such a group to form around her linket. Or the users might have this means, and Jane is unable to prevent it. A policy decision of the Registry.

The user group can be considered a community or social network around the linket and its owner. Currently, an app can enable similar functionality to users directly accessing the app. But there are several differences between that and this submission.

From FIG. 4, users can go to a message board or bulletin board format, where they can ask questions and get replies from other users of the same linket. FIG. 3 shows item 38. Where 2 users (entities) in a linket group can interact (eg. send messages) with each other via the Registry.

When the app lets a user group form, that data is held on the app server. In our case, a user group emerges and its data is held in the Registry. Also, this action is independent of whether the app has its own user group or not. It does not require the permission of the app company.

Further, the user group is associated with the linket. The linket may currently point to a specific app in its deep link. But as we have emphasised in earlier submissions, the linket owner has a right to map her linket to another app by another app company.

Suppose Jane were to migrate her linket from app muse5 to another app jkl10. The Registry can keep a record of which users in her user group joined when using muse5 and which users joined when using jkl10. The Registry could display such information in the GUI or make it available to the users, to give them more information about their peers in the group.

A linket is a brand of its owner. So now one reason a linket owner might encourage a user group to emerge around her linket is that it encourages the building of a loyal customer or fan base.

Jane can own several linkets. The Registry might let her control whether users in one linket group can see and interact with users in another of her linket groups.

Jane might be able to control whether her linket group of FIG. 4 is viewable by others not in the group or any other linket group of hers. The Registry could have a policy to make such groups world viewable by default.

Because a linket user group can add value to Jane, the Registry could charge Jane for the formation and hosting of the group. Or in a more fine grained manner, the Registry might allow the group to be formed gratis. But charge Jane to enable extra features.

One such extra feature can be the means for Jane to send messages to some or all of the group. The underlying current app of the linket may or may not allow this. If not, an alternative is for Jane to ask each user for an email address and then send them messages via a normal email provider, outside the app. This can entail some manual work by her to collect the addresses. But doing so via the Registry saves her that effort.

The linket group can be subdivided by various means. One is the location of the user. When a user sends the linket to the Registry, the Registry takes the user's electronic address and finds an approximate location. This is a well known method when the network is the Internet. The addresses are allocated to devices at hot spots or devices at telecom providers. These cases are the usual means by which a user device that is mobile connects to the Internet. An Internet Service Provider (ISP) or Network Service Provider (NSP) handing out the addresses typically gets some data about the location of the hot spots or data centers of the telecom providers. These can suffice to narrow down the location of the user to a city. This can be fine grained enough to permit the Registry to automatically group users down to a region like a district or city.

Figure 5:
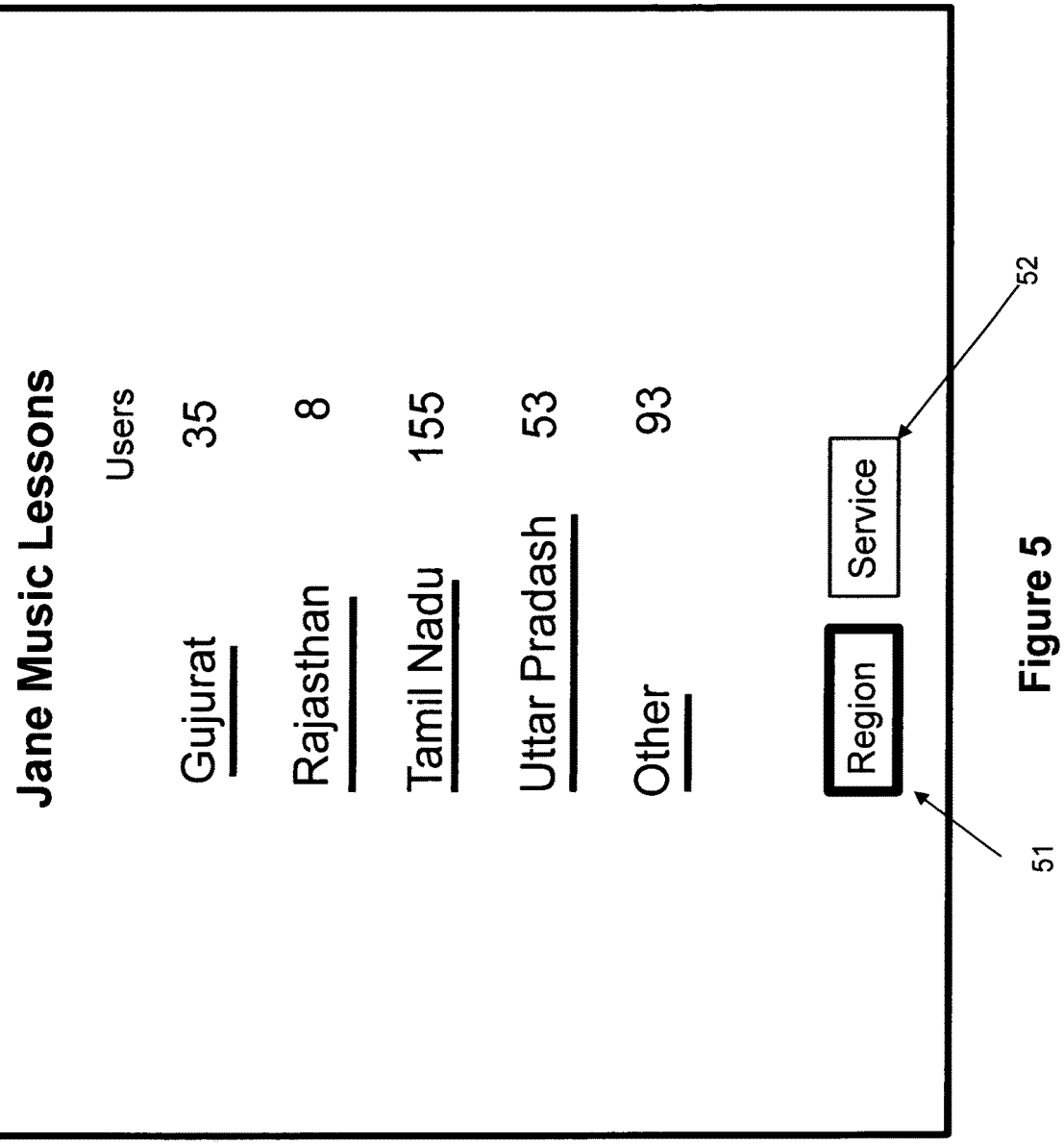
FIG. 5 shows a page of users grouped by location.

An example is shown in FIG. 5. Item 50 is a web page, though it might also be a screen in a mobile app. As with FIG. 4, we consider the cases to be equivalent. The Registry in FIG. 1 sends the network addresses to an external geo server 19. Which returns the geographic information about the addresses. FIG. 5 groups the users according to which (Indian) state they are in. Assuming that most of Jane's users are in India. Clearly, this can be applied elsewhere. The horizontal black lines under each term indicate that the term is clickable.

Item 51 is a button or setting that has been pressed, to show the users grouped by location. The thick black border around 51 indicates this. If Gujurat is picked, a similar figure might appear, showing the distribution of users inside that state.

Item 52 is labelled Service. This is a button that has not been picked. The label means group the users by the service or good that they are using the linket for. (This might not be implemented for some linkets.) The Registry could offer a webpage or via a Registry app so that users can voluntarily put themselves in a group. See FIG. 6, where the groups are the musical instruments or music composition that Jane provides teaching services for.

The definition of the groups can be done by Jane. There could be webpages accessibly only by the linket owner, where she sets these up. She might define a hierarchy of groups if appropriate.

A user might be able to be in 2 or more groups. He is learning composition and sitar, for example.

Jane can also manually put a user in a group or groups. She might also be able to tell the Registry not to let users assign themselves to a group. If users do the latter, she can move them to other groups if she thinks they have misclassified themselves.

Figure 6:
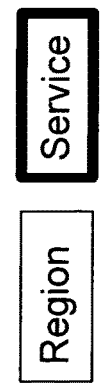
FIG. 6 shows a page of users grouped by service.

FIGS. 3 and 6 depict location and service as mutually exclusive in terms of displaying the data. This can be extended. It is straightforward to imagine a page that shows first a division of all the users by region, like FIG. 5. When one region is picked, the view of those users might be not by subregion but service (or good), like FIG. 6. These are standard ways of showing structured data.

If the Registry asks users for GPS location data from their devices, and if the users give the Registry this data, then it can offer far more precise location searching.

3: Change Ownership of a Linket;

Suppose Jane, the owner of a linket, ends her ownership of the linket. This could be if she does not renew her ownership with the Registry. Or she sells the linket to another entity. What happens to the linket group?

The Registry might have different policies for each case. For non-renewal, the Registry could still maintain the linket group. Even if the linket is de-registered. Users in the group can still communicate with each other via the Registry. While there are costs in storage and bandwidth, a potential benefit is that the users constitute a potential demand for whatever service was provided by the owner. This can have value to a new person coming along to take ownership of the linket.

Of course, this assumes that the users considered the linket to be of use to them. Perhaps one reason the owner abandoned the linket was that she did not provide anything useful, in their estimation.

If Jane sells the linket, the Registry can have a policy to maintain the group. This has value to the new owner. In part, the new owner may have bought the linket based on what he could see in the feedback of the bulletin board of the users. It is to the Registry's advantage to do this, for it maintains value in the linket for current and future owners.

Having said this, the Registry might designate in some manner in its web pages for the linket group those users who joined when Jane was the owner and the users who joined under the new owner. The latter users might ask the former users about their experiences with Jane. Especially if the former users keep using the linket under the new owner. These are all valuable interactive market data, to the new owner and to others who might be considering using the linket under the new owner. They might hold back and see messages between those groups of users, to ascertain if they wish to commit.

A related use is for the linket users to be able to rate the linket owner. When ownership changes, the rating of the previous owner should not carry over to the new owner.

Also, suppose a person owns several linkets, and has ratings for each. He could have a composite rating. A simple average might be computed. Or a weighted number, where the weight is proportional to the number of users in each of his linket groups. If he takes ownership of a pre-existing linket, this composite rating could be temporarily shown for his new linket. Guides the existing and potential users of the linket with some information about him.

4: Subcontracting;

Suppose Jane does time sharing with her linket. She works an 8 hour time slot Monday to Friday. For other time slots in those days and for the weekend, she subcontracts to other entrepreneurs or instructors in the same field as her. Suppose the second time slot for the weekdays is run by Doris and the third time slot by Magda. See FIG. 7. It shows in web page 70 the tutors and the users grouped by which tutor they have. Each tutor is clickable. Doing so drills down to a screen showing her students.

This can also be extended to the case where in the same time slot, there are several tutors.

In general, a student of one tutor should be able to see information about students of other tutors. This lets a student change tutors, which acts as a quality control on the tutors.

5: Implications;

The automated building of an app social network can be done. But it is harder to find information about users who send linkets to the Registry, asking for the deep links. In general, all the Registry knows about a user is the network address of the device that the request is coming from.

By contrast, the Registry knows a lot more about the owner of the linket. When she bought a linket from the Registry, it can ask her for data about herself. Like a name and mailing address and, for example, credit card information, if she pays with a credit card. Plus, if the Registry lets her write explanatory text about the intent of her linket (what goods or services it sells?), this is more useful information. And she might be able to upload to the Registry images about herself or the goods. And possibly audio. The latter is useful since it can be played on a mobile device of a user, while the user is looking at other things. The images and audio are extra data for analysis.

For the end user who does not own a linket, the Registry can do steps like see if repeated queries with linkets come from the same network address over a few hours. It might assume that these come from the same actual device and the same user. It can draw a node for that unknown user on a social graph, interacting with the linkets. Inferences can be made on a statistical basis. Likewise, if repeated queries come from network addresses near to each other over a short period of time, the Registry could assume these are the same user, if the queries are to the same or related linkets. Or that these are from different users. But if the queries all go to the same linket, they might be users in the same class. In a social graph, vertices can be drawn between these users, indicting the same interests, and in physical proximity. The weight of such a vertex can be higher than between 2 users with addresses close to each other but who are using linkets on different topics.

Suppose some or all of the steps of the previous section are done. There is value to several parties. Immediately, the Registry has far more data on users who use a linket to interact with the linket owner.

Linket owners benefit. They can to some extent have a customer base or audience that they can take with them if they decide to use another app. Unlike currently where app users are tied to the app. Reduces the lock-in of apps.

Users benefit. A user can more easily find other users of the same linket. To see the opinions of the users and to engage with them. Making a more efficient use of the goods or services. In part, when a user asks other users for advice, he is more likely to get objective information than from asking the linket owner.

If a table of users in a linket group is world viewable, it can be seen by users who have never used that linket. So a potential customer of the linket might contact existing users in the group to canvas their opinions. Another way for the Registry to deliver value.

A benefit to the owner of a linket is that some of the burden of answering questions is removed, by pushing this onto the user base. Plus she now has valuable feedback data, from studying what her users write to each other. This can complement the standard use of surveys sent to the users.

The Registry benefits by enabling access by advertisers or market analysts to the social network data. An advertiser gets data about the demographics of various user groups. And automated analysis of the message boards can yield trend information about products and services.

6: Look for Users with Specific Interests;

Suppose the Registry can find information about the same user across the linkets that he uses. He might use the same identifier from GOOGLE Corp. or FACEBOOK Corp., for example. Across all such users, the Registry can allow the following.

It lets a search be done for users using linkets (and hence apps) on 2 or more topics. Music and psychology, for example. There is no need for the users to self-describe using those keywords. Instead, the keywords come from the descriptions that linket owners gave about their linkets, and app companies gave about their apps.

One use is for a user to find other users with desired habits. Small social networks can form, where the users make these networks out of the data acquired by the Registry. A man might want to look for a woman who has interests in 2 or more fields, where these can be professional or recreational.

Such searches have an advantage over searches on dating apps or websites. Those are largely self-described. People who write about themselves make statements about their hobbies or background that are typically not verified by the app company or website. But with the Registry, the search is over actual linket inquiries made by users. Over what they did rather than what they said.

This can be carried further. Suppose a user Doreen asked the Registry about linkets on psychology 50 times over the last month. While another user Linda asked about linkets on the same topic 8 times in same period. Assuming no other information to the contrary, a man who got these results could infer that Doreen is a more active psychology student.

Of course there are caveats. What if Doreen is a full time student while Linda is part time? And Linda is close to graduating. Or if Doreen is a student right now while Linda's college is on summer hiatus. But keeping such in mind, if the man wants to date a "serious" psychology student, he might contact Doreen.

The Registry might offer an in-depth search of a specific user or a few users. Showing a summary of their linket activities over several years. This may give a good summary of the users' diversity of interests. Letting the searcher get a better assessment of the overall aspects of the users.

Going further, a search can also include searching what users have written on the various message boards hosted by the Registry. The person searching can get more data about an individual's attitudes and beliefs. The postings might reveal how logically a person can reason.

To the extent that the Registry can offer some sort of verification on a person's interests and activities, it can offer this via an API. Other websites, like a resume website or a dating website can ask the Registry, for a suitable fee. The website sends a query with the credentials of a user. This might be or include an email address, for example. The Registry proceeds to search its database. It returns either a summary or more comprehensive statistics.

Suppose the query from the website is "here is johnDoe55@gmail.com, and he says he studies psychology. Can you verify?". In practice, the query would be in a structured format, but we write it in equivalent human readable context as that example sentence.

The Registry gets this and returns yes or no, as a summary.

If the website pays more for more results, the Registry could return a list of linkets and associated apps that he used, and how often in the last year, say, he did so. With statistics for each month, for example.

On the issue of privacy for John Doe, the Registry might ask him, when it got the query, for permission to reply with the summary. Or for permission to give more results. A target of such a search might actually want to do so, because it helps validate his bona fides. Whether the search is by a potential employer or spouse.

This approach works across all linkets and apps. The alternative is a fragmented ad hoc approach. The questioner makes manual inquiries of each app or website that a person says he uses. Or uses different APIs that app companies or websites have to ask them about one of their users.

At the level of a linket group, the Registry can compute how many times per week or month (etc) that each user makes a query of the linket to the Registry. It can compute aggregate number or numbers for the linket group. By making these numbers world viewable, the visitor can see how active or engaged the linket group is. This goes further than a simple count of how many users there are in a linket group.

7: Map Users with Linkets and Topics;

In this section we present a general mechanism of a linket user looking for users of similar interests. It uses the structure of a linket and the deep link. Consider a user Bill who uses a given linket Alpha. He wants to see users of similar interests. There is a hierarchy of interests that is effectively akin to a simple qualitative metric. See FIG. 8. Item 81 is the users in the same linket group as Bill. His classmates, if the linket teaches a topic. This linket uses a given app.

Other users use that app in a different linket. They have a different teacher (if the linket teaches a topic). See item 82. These users are further from Bill.

Other users use a different app (which has a different linket) for the same topic that Bill is interested in. Remember that if an app is for a given topic, and the topic has some popularity, then over time, competing apps for that topic are likely to emerge. See item 83.

Then there are users of different topics. These topics can be arranged in some manner (or metric) that separates them from Bill's topic. So if the latter is calculus, a different but nearby topic might be trigonometry. A more distant topic would be computing or physics. See item 84.

On the subject of distance between topics, or the related issue of identifying topics, there has been much work done in the prior art. This can be reflected in the internal structure of item 84.

Figure 8:
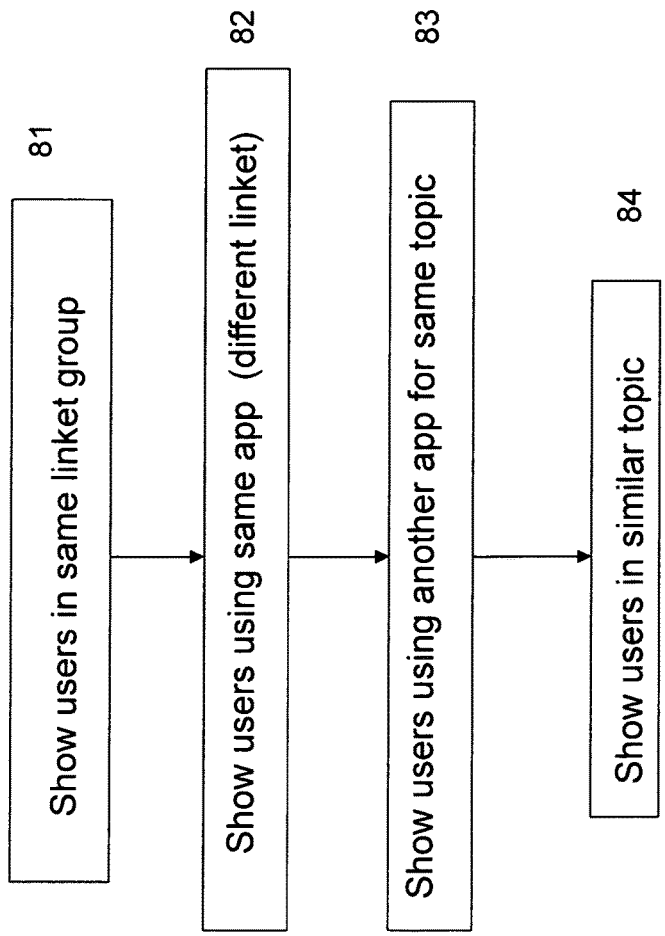
FIG. 8 is a flow chart of topic distance between users.

If the Registry makes available its data using the methods of FIG. 8 (and methods of the prior art), then Bill could search the data for various objectives. For example, he might want to ask advice from others studying his topic. He can start with his "class" that is the linket group he is in. But he can step outside, so to speak, and find and consult with students being taught in other linkets, that use the same app as the linket he uses.

Note that FIG. 8 only used the linket and app id part of the deep link. The Registry can also use the network address id in the deep link. By mapping that to a geographic location associated with the network address, the Registry can derive an approximate location of the linket owner. And by using the network address of the user's device, when the device sent the linket to the Registry, the Registry can get an approximate location of the user. Neither needs the user device to give the Registry its actual lat-long GPS coordinates. Though of course a variant is where the Registry asks the user device and the user device hands over the actual location coordinates.

Figure 9:
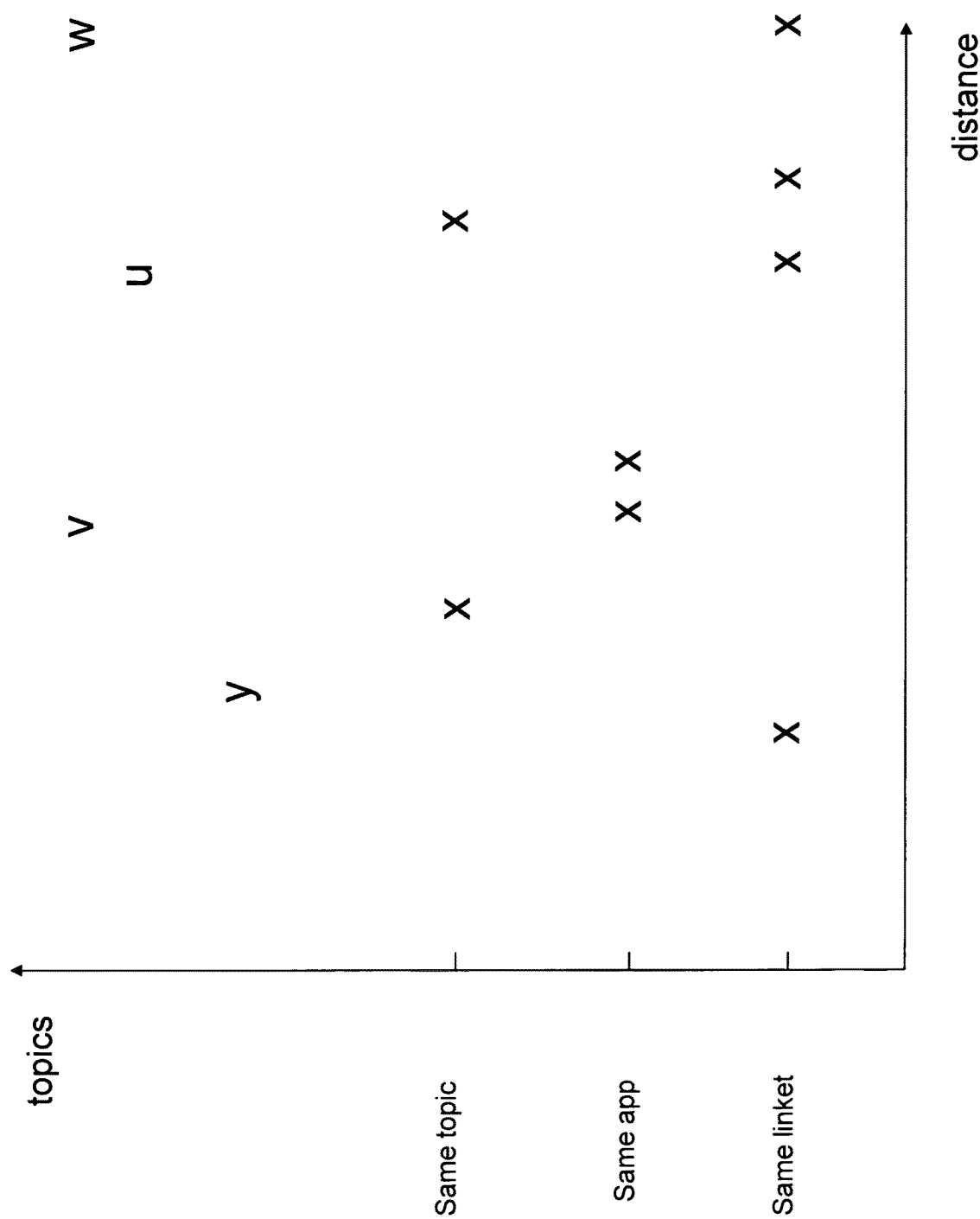
FIG. 9 is a graph of topic and distance of other users from a user.

See FIG. 9. This shows the "distance" of other users from Bill. The horizontal axis is the actual distance (perhaps on a log scale). This might be derived from the network address or the actual lat-long of the user devices. The vertical axis is the topic distance. The lowest y rung is for users in the same linket group. The next higher y rung is for users using the same app, but who are in other linkets. The next higher y rung is for users in the same topic, but using different apps for that topic. Above this are users in topics different from Bill's topic.

Of course, FIG. 9 can be made much more elaborate. But it is supplied as a deliberately simple graphical case of how to use both traditional topic metrics and actual distance.

The Registry can supply FIG. 9 to Bill, in a browser web page or in an app. In either case, some or all of the users shown in the figure can be contactable by Bill. The Registry might let any user being graphed to decide whether she will be contactable. There can be simple graphical options. Bill can ask the graph to only show contactable users. So that he can interact with them, for advice.

Another use might be if the user is having difficulty with the pace of exposition by his linket tutor. He can search linkets teaching the same topic. He can ask students taking those courses and perhaps decide to change linkets (classes).

Another use is if his tutor closes shop and stops teaching via her linket. Bill can search nearby linkets and migrate to one of those to continue his studies.

FIG. 9 can be elaborated to include time dependence. The users shown in the figure can be for a given time period. There might be a "play" button that shows the users as time advances. Bill can see the time evolution of how users are distributed with respect to his linket group. Initially there would likely be no or few users in the earliest time period in which the linket existed. Over time, more users might come into the group. But Bill can also see the behavior of users using other linkets. The dynamics of such can indicate group trends. If some linkets attract more users, this can produce a positive feedback loop to get even more users, if they use such graphics supplied by the Registry.

A feature of this section is that it goes beyond typical work in the prior art. The use of linkets and the underlying deep links, that refer to apps, adds extra structure to a topic graph. As a practical matter, the use of specific apps means the availability of specific functionality that users can partake. And by the linkets pointing to specific tutors, the user can find a tutor suitable to his needs. By finding and asking users in the same or similar areas, and picking an app and a tutor under which to study.

I claim:

1. A method of a Registry server on a network; where the Registry receives a linket Delta from a user on the network; where the linket is a string; where the Registry replies with a deep link Alpha; where Alpha comprises of an application identifier and a network address identifier; where the Registry defines a linket user group as a plurality of such users associated with the linket, in a database held by the Registry; where the Registry receives data describing the user, from the user;

where the data comprises of one or more of a) a name, b) a nickname, c) a comment, d) an electronic address, e) a geographic location;

where the Registry stores the data in the database; where, in the database, the data is associated with the user in the linket user group;

where the Registry accepts ratings of Delta from users in the linket user group of Delta; where the Registry computes an aggregate rating Theta; where the Registry makes Theta accessible to machines on the network;

where the ownership of Delta changes; where the Registry accepts new ratings from users in the linket user group of Delta; where the Registry computes an aggregate rating Phi; where the Registry makes Theta and Phi accessible to machines on the network.

* * * * *